(12) United States Patent
Wang et al.

(10) Patent No.: US 10,642,650 B2
(45) Date of Patent: May 5, 2020

(54) MULTI-THREADED ROUTE PROCESSING

(71) Applicant: Juniper Networks, Inc., Sunnyvale, CA (US)

(72) Inventors: Kevin F. Wang, Acton, MA (US); Jaihari V. Loganathan, Cupertino, CA (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 15/841,023

(22) Filed: Dec. 13, 2017

(65) Prior Publication Data

US 2019/0179668 A1 Jun. 13, 2019

(51) Int. Cl.
| | |
|---|---|
| G06F 9/48 | (2006.01) |
| H04L 29/08 | (2006.01) |
| H04L 12/733 | (2013.01) |
| H04L 12/741 | (2013.01) |

(52) U.S. Cl.
CPC .......... *G06F 9/4881* (2013.01); *H04L 45/122* (2013.01); *H04L 45/74* (2013.01); *H04L 69/325* (2013.01)

(58) Field of Classification Search
None
See application file for complete search history.

(56) References Cited

U.S. PATENT DOCUMENTS

| | | |
|---|---|---|
| 7,184,437 B1 | 2/2007 | Cole et al. |
| 7,245,619 B1 * | 7/2007 | Guan ...................... H04L 45/02 370/389 |
| 8,937,961 B1 * | 1/2015 | Vairavakkalai ......... H04L 45/02 370/401 |

(Continued)

FOREIGN PATENT DOCUMENTS

| | | | |
|---|---|---|---|
| CN | 101741705 A | * | 6/2010 |
| CN | 101741705 A | | 6/2010 |

(Continued)

OTHER PUBLICATIONS

Lei et al., "An Improved Parallel Access Technology on Routing Table for Threaded BGP," 2009 15th International Conference on Parallel and Distributed Systems, Dec. 1, 2009, 7 pp.

(Continued)

*Primary Examiner* — Natisha D Cox
(74) *Attorney, Agent, or Firm* — Shumaker & Sieffert, P.A.

(57) ABSTRACT

In general, the disclosure describes techniques for distributing processing of routes among multiple execution threads of a network device. In some examples, a method includes identifying, with a thread of a plurality of execution threads, a first route processing thread of the execution threads to process a first route of a routing protocol, the first route received by the network device; identifying, with the thread, a second route processing thread of the execution threads to process a second route of a routing protocol, the second route received by the network device; processing, by the first route processing thread executing on a first core of the plurality of processing cores, the first route; and processing, by the second route processing thread executing on a second core at least partially concurrently with the first route processing thread executing on the first core of the plurality of processing cores, the second route.

21 Claims, 6 Drawing Sheets

(56) References Cited

U.S. PATENT DOCUMENTS

| | | | |
|---|---|---|---|
| 2003/0110289 A1* | 6/2003 | Kamboh | H04L 45/00 709/242 |
| 2004/0160969 A1* | 8/2004 | Moon | H04L 45/02 370/401 |
| 2005/0135256 A1 | 6/2005 | Ball et al. | |
| 2005/0169281 A1* | 8/2005 | Ko | H04L 45/00 370/400 |
| 2011/0242991 A1* | 10/2011 | Zhang | H04L 45/02 370/242 |
| 2016/0352619 A1* | 12/2016 | Gattani | H04L 45/24 |

FOREIGN PATENT DOCUMENTS

| | | | | |
|---|---|---|---|---|
| CN | 102394809 A | * | 3/2012 | |
| WO | WO-2012083704 A1 | * | 6/2012 | H04L 45/02 |

OTHER PUBLICATIONS

Liu et al., "MR-PBGP: A Multi-Root Tree Model for Parallel BGP," 2012 IEEE 14th International Conference on High Performance Computing and Communications, Jun. 25, 2012, 8 pp.

Brands et al., "Parallelization of BGP for route server functionality—A protocol and implementation study," amsix Amsterdam Internet Exchange, MSc Research Project System and Network Engineering, Aug. 4, 2017, 51 pp.

Ishida, "GoBGP: yet another OSS BGPd," NTT Software Innovation Center, RIPE-71, retrieved from https://ripe71.ripe.net/presentations/135-RIPE71_GoBGP.pdf, Nov. 2015, 26 pp.

Extended Search Report from counterpart European Application No. 18197496.5, dated Mar. 25, 2019, 41 pp.

Response to Extended European Search Report in counterpart EP Application No. 18197496.5, filed Dec. 18, 2019, 5 pp.

* cited by examiner

MULTI-THREADED ROUTE PROCESSING

TECHNICAL FIELD

This disclosure generally relates to computer networks and, more specifically, to network routing protocol processing.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes for the network. In general, a route indicates reachability information for a network prefix. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device for a given route. Upon receiving an incoming packet, the router examines information within the packet to identify the destination for the packet. Based on the destination, the router forwards the packet in accordance with the forwarding information.

Some computer networks, such as the Internet, an administrative domain or network, often include many routers that exchange routing information according to a defined routing protocol. Examples of the defined routing protocol may include, among others, the Border Gateway Protocol (BGP), the Intermediate System to Intermediate System (IS-IS) Protocol, and the Open Shortest Path First (OSPF) Protocol. When two routers initially connect, the routers exchange routing information and generate forwarding information from the exchanged routing information. Particularly, the two routers initiate a routing communication "session" via which they exchange routing information using routing protocol messages according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to inform that some routes are no longer available.

A computer network using a routing protocol, like BGP, for example, directs data packets between network nodes based on addressing information with the data packets. A routing protocol route advertisement, like a BGP UPDATE message, advertises one or more routes for network prefixes reachable via the network. A routing domain, such as a BGP network, may include one or more routers, route reflectors, nodes, and endpoint devices (e.g., servers, printers, and computers). Some of the routers within the routing domain may be grouped together into redundant clusters. Each router within the routing domain typically forwards packets according to routes stored at the router and the destination address of the data packets. Route reflectors, such as BGP route reflectors, peer with other routers to receive and advertise routes but typically do not forward packets according to the routes.

SUMMARY

In general, the disclosure describes techniques for distributing processing of routes among multiple execution threads of a network device. For example, a network device, such as a router or route reflector, receives routes from multiple peer devices, each of the routes specifying reachability information for a network prefix. The routes may be received and represented in part as one or more network prefixes included in a route advertisement, such as a Border Gateway Protocol (BGP) UPDATE message. A software thread executing on a processing core of the network device initially processes a received route to identify one of a plurality of route processing threads executing on the network device with which to process the route. Such identification may include applying a hash function to a network prefix for the route. The thread then signals the identified route processing thread to process and store the route. Example processing steps performed by a route processing thread for a route received in a routing protocol message may include, for instance, receiving and parsing the received routing protocol message, creating a new route, resolving a next hop for the route, preparing a new routing protocol message for advertising the route with the resolved next hop (for instance), and sending the new routing protocol message to one or more routing protocols peers of the network device.

Techniques for facilitating consistency among the route processing threads as respects the overall routing information state of the network device are also described. Such techniques may include facilitating route resolution for the distributed routes stored by the one or more route processing threads, route aggregation, and route display functions among the route processing threads.

The techniques may provide one or more advantages. For example, the techniques may improve parallelization for inbound route processing within a network device by distributing route processing among multiple route processing software threads according to route prefixes associated with the advertised routes. This may reduce the latency for processing any given route received by the network device and/or may reduce the overall route convergence time for the network device.

In one example, a method includes identifying, with a thread of a plurality of execution threads for at least one routing protocol process executing on a plurality of processing cores of at least one hardware-based processor of a network device, a first route processing thread of the execution threads to process a first route of a routing protocol, the first route received by the network device; identifying, with the thread, a second route processing thread of the execution threads to process a second route of a routing protocol, the second route received by the network device; processing, by the first route processing thread executing on a first core of the plurality of processing cores, the first route; and processing, by the second route processing thread executing on a second core of the plurality of processing cores at least partially concurrently with the first route processing thread executing on the first core of the plurality of processing cores, the second route.

In one example, a network device includes a network interface card; and at least one hardware-based processor comprising a plurality of processing cores for executing a plurality of execution threads for at least one routing protocol process, the at least one hardware-based processor configured to: identify, with a thread of the plurality of execution threads, a first route processing thread of the execution threads to process a first route of a routing protocol, the first route received by the network device; identify, with the thread, a second route processing thread of the execution threads to process a second route of a routing protocol, the second route received by the network device; process, by the first route processing thread configured to execute on a first core of the plurality of processing cores, the first route; and process, by the second route processing thread configured to execute on a second core of the plurality of processing cores at least partially concurrently with the first route processing thread executing on the first core of the plurality of processing cores, the second route.

In one examples, a non-transitory computer-readable medium includes instructions that, when executed, cause one or more hardware-based processors of one or more network devices to perform operations including: identifying, with a thread of a plurality of execution threads for at least one routing protocol process configured for execution on a plurality of processing cores of the one or more hardware-based processors, a first route processing thread of the execution threads to process a first route of a routing protocol, the first route received by the network device; identifying, with the thread, a second route processing thread of the execution threads to process a second route of a routing protocol, the second route received by the network device; processing, by the first route processing thread executing on a first core of the plurality of processing cores, the first route; and processing, by the second route processing thread executing on a second core of the plurality of processing cores at least partially concurrently with the first route processing thread executing on the first core of the plurality of processing cores, the second route.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
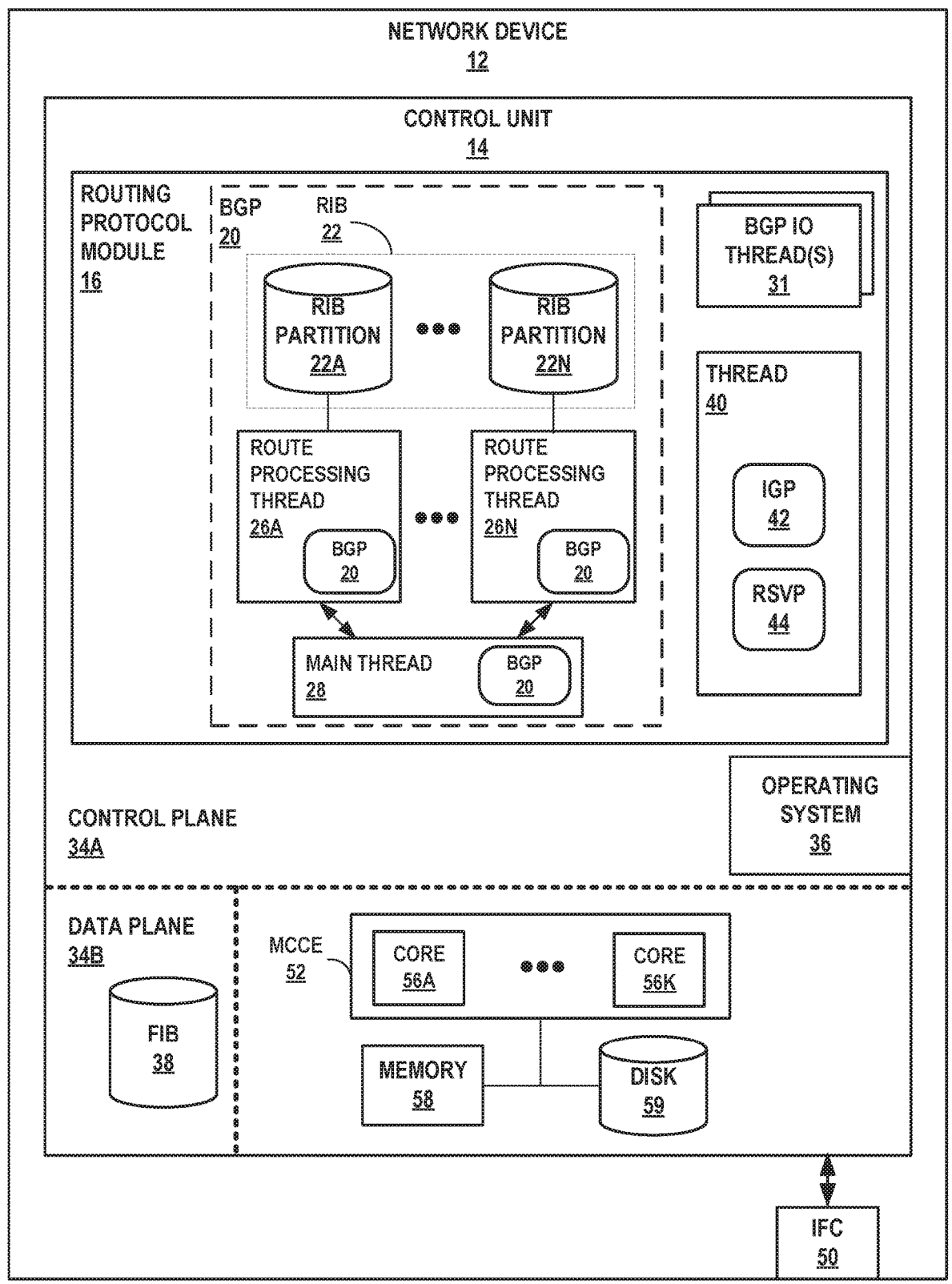
FIG. 1 is a block diagram illustrating an example network device configured to execute parallel route processing threads, according to techniques of this disclosure.

FIG. 1 is a block diagram illustrating an example network device configured to execute parallel route processing threads according to techniques of this disclosure. Network device 12 may represent a router, route reflector, or other network device that is connected via one or more network links to other network devices that advertise routes to the network device 12. For example, network device 12 may be a core or edge router of a service provider network, enterprise network, edge network such as a data center network, an access router, a controller, a real or virtual server or other compute node configured to execute a route or route reflector, or a route reflector of any of the aforementioned networks or other network.

Network device 12 includes a multi-core computing environment 52 that includes a plurality of CPU processors or cores 56A-56K (collectively, "cores 56"), where "K" is an integer greater than one. Multi-core computing environment 52 may include any number of processors and any number of hardware cores from, for example, four to thousands. Each of processing cores 56 each includes an independent execution unit to perform instructions that conform to an instruction set architecture for the core. Processing cores 56 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, a "processor" or "processing circuitry" may refer to one or more cores 56.

Memory 58 represents a main memory. Examples of memory 58 include non-transitory computer-readable mediums including memory such as random-access memory (RAM) (including various forms of dynamic RAM (DRAM), e.g., DDR2 SDRAM and DDR3), or static RAM (SRAM), and Flash memory. Storage disk 59 is a form of fixed or removable storage medium that can be used to carry or store desired program code and program data in the form of instructions or data structures and that can be accessed by a processor, or any other type of volatile or non-volatile memory that stores instructions to cause the one or more cores 56 to perform techniques described herein. Examples of storage device 59 include a disk drive and/or an optical drive.

Multi-core computing environment 52, memory 58, and storage device 59 provide a hardware operating environment for a control unit 14 that performs control plane 34A and, in some cases, forwarding or data plane 34B functionality for network device 12. That is, in this example, control unit 14 is divided into two logical or physical "planes" to include a first control or routing plane 34A ("control plane 34A") and a second data or forwarding plane 34B ("data plane 34B"). That is, control unit 14 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A defines control plane functionality of network device 12. Control plane 34A manages and controls the behavior of network 12, including the behavior of data plane 34B. Operating system 36 of control plane 34A provides a run-time environment for multiple different processes each made up of one or more execution threads. Operating system 36 may represent, for example, a UNIX operating system derivative such as Linux or Berkeley Software Distribution (BSD). Operating system 36 may offer libraries and drivers by which processes may interact with data plane 34B, for example, or other hardware of router 30, including a file-system and main memory for network device 12. Libraries and drivers of operating system 36 may include Application Programming Interfaces (APIs) that provide standard interfaces for developers to invoke the functionality of operating system 36 and network device 12 exposed by the libraries and drivers. Operating system 36 supports multi-threading for multiple software execution threads. Although described with respect to a network device 12 that includes a data plane 34B for forwarding packets in accordance with routing information including received routes, the techniques of this disclosure are applicable to network devices, such as controllers and route reflectors, that perform control plane 34A operations but may perform limited data plane 34B operations with respect to forwarding packets in accordance with routing information including received routes. In some cases, the control plane 34A and data plane 34B are not co-located within a single network device chassis but are distributed among multiple devices. For example, examples of network device 12 that are controllers may perform the techniques described herein with respect to route processing and program, using software-defined network (SDN) techniques, one or more network nodes with forwarding information to implement the realize the routes within the network.

Network device 12 includes one or more network interface card(s) 50 coupled to control unit 14 via a bus or other communication links. Interface card(s) include one or more ports configured to receive network cables to couple network device 12 to other network devices that advertise routes according to a routing protocol.

Control unit 14 is configured to execute a routing protocol module 16, which represents one or more computer processes for managing routing information of network 12 by, e.g., executing routing protocols to advertise and receive routes, processing received routes to resolve next hops, and in some cases generating forwarding information. In the example of network device 12, forwarding information for the network device 12 is represented by forwarding information base 38 of data plane 34B. Other operations performed by routing protocol module 16 may include computing label-switched paths (LSPs), signaling LSPs using an LSP signaling protocol, managing routing instances, managing layer 2 and layer 3 virtual private networks, and managing multicast groups and computing multicast distribution trees for multicast traffic, for instance.

Routing protocol module 16 includes multiple software execution threads 26, 28, 31, and 40, each of which may execute on a different one of cores 56. Threads 26, 28, 31, and 40 may be scheduled by operating system 36 for execution by cores 56 according to a multi-threading scheduling scheme, e.g., using time-slicing, and routing protocol module 16 may represent an overall software process having the multiple software execution threads.

As one example, thread 40 executes one or more protocols such as interior gateway protocol (IGP) 42 and resource reservation protocol (RSVP) 44. IGPs for IGP 42 may include open shortest path first (OSPF), intermediate system to intermediate system (IS-IS), and routing information protocol (RIP), for instance. Other protocols (not shown) that may be executed by thread 40 may include signaling and control protocols for L3VPN, L2VPN, Ethernet VPN, Multicast VPN, Virtual Private LAN Service, Protocol Independent Multicast, Label Distribution Protocol, for instance. In some examples, main thread 28 and thread 40 may be combined as a single thread, or multiple threads that perform similar operations for a common set of protocols.

Although techniques of this disclosure are described primarily with respect to the Border Gateway Protocol (BGP), the techniques are similarly applicable to processing routing information received in routing protocol messages according to other layer 3 routing protocols, as well as interior gateway protocols in which route resolution is required, such as any distance-vector protocol (e.g., RIP).

Routing protocol module 16 includes one or more Border Gateway Protocol (BGP) input-output (IO) thread(s) 31 that receives and outputs routing protocol messages for a routing protocol, BGP 20 in this example. BGP IO thread(s) 31 may manage a receipt queue of routing protocol messages received by network device 12 at IFC(s) 50 for processing by main thread 28 and route processing threads 26A-26N (collectively, "route processing threads 26"). BGP IP thread(s) 31 may manage an output queue of routing protocol messages generated by routing processing threads 26 and for output via IFC(s) 50. The number of threads 26, N, may be configurable by a user or operator of network device 12. Routing protocol module 16 may include additional one or more threads (not shown) for managing and/or exchanging routes with the kernel routing table (also not shown).

In accordance with techniques described herein, routing protocol module 16 includes multiple, concurrently executing, route processing software threads 26 for distributing and performing distributed processing of routes, received in routing protocol messages by network device 12. In general, a routing protocol message advertises one or more routes, each route made up of a destination network prefix and a next hop router (or more simply, "next hop") of the network for reaching the destination network prefix. For example, a BGP UPDATE message is an example of a routing protocol message and includes a NEXT_HOP path attribute that specifies a next hop for one or more destination network prefixes included in respective network layer reachability information (NRLI) of the BGP UPDATE message. The destination network prefix and the next hop may be expressed as addresses in the Internet Protocol (e.g., IPv4, IPv6) address space. A next hop is an example of forwarding information for a network prefix.

Route processing threads 26 may be substantially similar in that each of routing processing threads 26 separate executes similar operations for processing routing protocol messages received by network device 12. Examples of such operations are described in further detail with respect to FIG. 2. Operating system 36 may schedule two or more route processing threads 26 to execute at least partially concurrently on respective cores 56 such that multiple route processing threads 26 may execute at least partially in parallel to process respective routing protocol messages concurrently. In addition, although the techniques are described primarily with respect to a single multi-threaded process (i.e., routing protocol module 16), the techniques may be applied using multiple threads executing within different processes located on a single network device or distributed among multiple different network devices. For example, a BGP IO thread 31 may execute on a load balancing device to distribute received routes among multiple separate network devices each configured to execute one or more of routing processing threads 26 to process routes in the manner described herein.

Route processing threads 26 manage respective, separate partitions of routing information in the form of routing information base (RIB) partitions 22A-22N. Each of RIB partitions 22 stores a different portion of routes that make up the overall RIB 22 for network device. In the example of FIG. 1, in which routing protocol module 16 processes BGP UPDATE messages, each of threads 26 and 28 execute at least a subset of the BGP routing protocol operations. For example, route processing threads 26 may process the BGP UPDATE messages, and route processing threads 26 and main thread 28 may cooperatively resolve next hops for routes received in the BGP UPDATE messages, as described in further detail below.

Network device 12 receives, via IFC(s) 50, routing protocol messages. As control plane messages, control plane 34A processes the routing protocol messages. In particular, routing protocol module 16 processes the routing protocol messages. For a routing protocol message received by network device 12, one of BGP IO thread(s) 31 initially processes the routing protocol message, which includes a route, to identify one of the route processing threads 26 with which to process the route. For example, a BGP IO thread 31 may apply a hash function to a network prefix for the route, where a number of hash buckets for the hash function is configured to be the number of route processing threads 26 and each hash bucket corresponds to the assigned route processing thread 26 for routes hashed to the hash bucket. The BGP IO thread 31 may apply the hash function to select bits of the network prefix in some cases, and in some cases BGP IO thread 31 may apply the hash function to other attributes of a received routing protocol message in addition or in the alternative to the network prefix. As another example, the BGP IO thread 31 may apply another operation to identify one of the route processing threads 26 with which to process the route, such as using bit patterns applied to bits of a network prefix, the masked values of which being mapped to the route processing threads 26. In such cases, BGP IO thread 31 stores a data structure that maps each result value for application of bit patterns to one of route processing threads 26.

The BGP IO thread 3 then signals the identified route processing thread 26 to process the route. For example, BGP IO thread 31 may add the route or the full routing protocol message to a queue of routing protocol module 16 and shared by the various route processing threads 26 but processed by the identified route processing thread 26 for the route.

The techniques may provide one or more advantages. For example, the techniques may enable or improve parallelization for route processing within network device 12 by distributing route processing among the multiple route processing threads 26 by route prefix, rather than by route processing task or operation. This may reduce the latency for processing any given route received by the network device 12 and/or may reduce the overall route convergence time for the network device 12.

Figure 2:
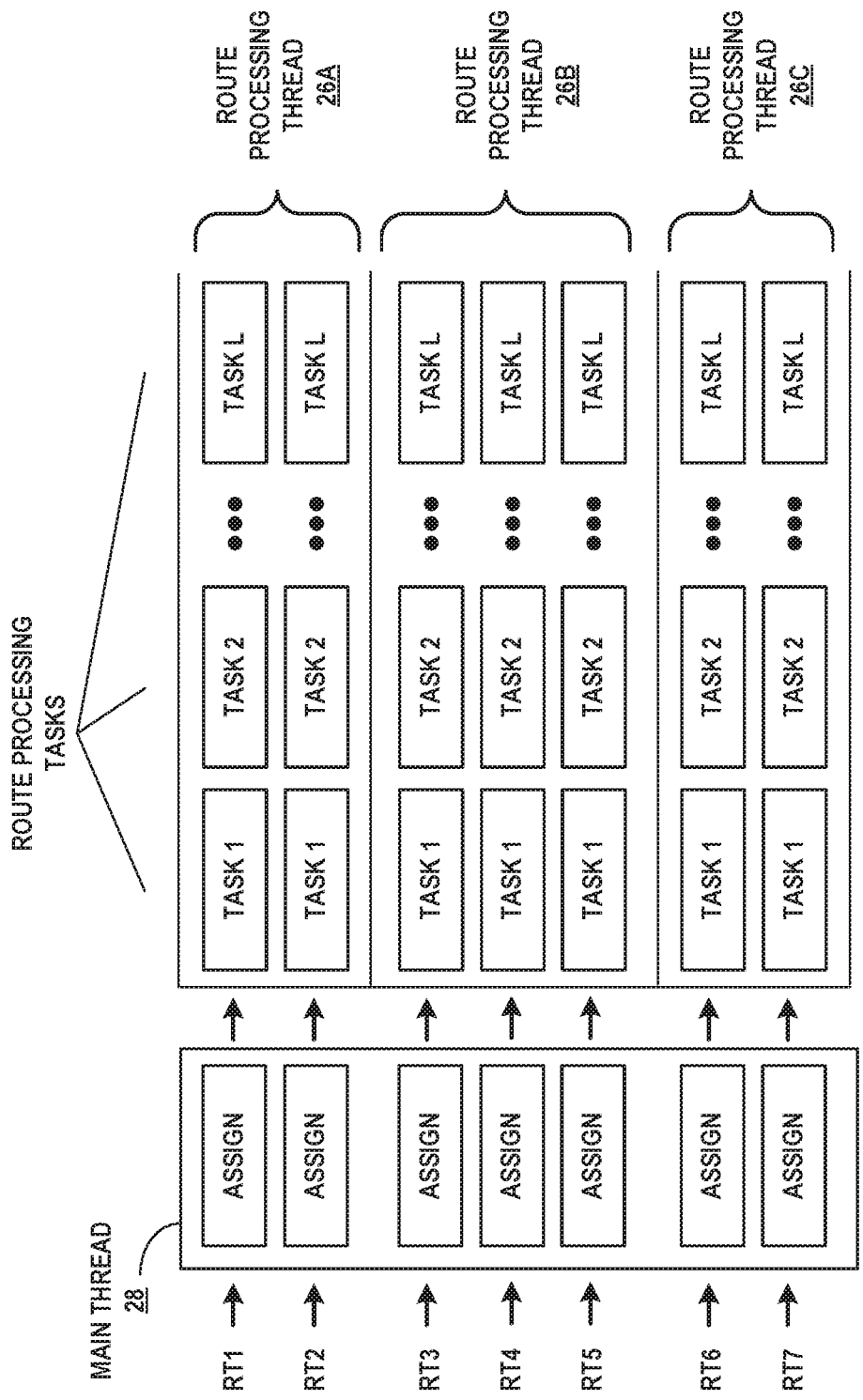
FIG. 2 is a conceptual diagram illustrating distributed, parallel route processing by multiple route processing threads, according to techniques described in this disclosure.

FIG. 2 is a conceptual diagram illustrating distributed, parallel route processing by multiple route processing threads according to techniques described in this disclosure. The route processing is described with respect to network device 12 of FIG. 1. Each of route processing threads 26 of routing protocol module 16 separately performs one or more route processing tasks, Task 1-Task L. Task 1-Task L may include, as examples, parsing the routing protocol message, applying a routing policy such as an import or export policy, generating a route from the routing protocol message (e.g., by associating a network prefix and next hop included therein), resolving the next hop for the generated route, enqueuing data for advertisement from the routing information base, and generating a new routing protocol advertisement to advertise the generated route. For example, for routing protocol messages that conform to BGP, Task 1 may be "Parse UPDATE," Task 2 may be "Create Route," Task 3 may be "Resolve Next Hop," Task 4 may be "Queue route output," Task 5 may be "Form UPDATE." The BGP IO thread(s) 31 and/or thread 40 may perform receive and send operations for routing protocol messages. For example, for routing protocol messages that conform to BGP, such operations may include "Receive UPDATE" and "Send UPDATE."

Network device receives routes RT1-RT7 in respective routing protocol messages, each of the routes RT1-RT7 including a network prefix. For each route RT1-RT7, a BGP 10 thread(s) 31 performs a hash operation with the network prefix as an input. The network prefix may be input to the hash operation as a string of characters, a bitstring, a range, or other input format. The network prefix may include both the prefix and the prefix length. E.g., "1.0.0.0/8," where 1.0.0.0 is the prefix and 8 is the prefix length. The hash operation may be performed on less than the full bitstring of the network prefix in some example. Example hash functions used for the hash operation may include SHA1, MD5, and DJB2. An example DJB2 hashing function that receives a network prefix as a character string and returns an integer hash value that indicates a hash bucket corresponding to one of route processing threads 26 is:

```
unsigned long hash(unsigned char *str)
{
    unsigned long hash = 5381;
    int c;
    while (c = *str++)
        /* hash * 37 + c */
        hash = ((hash << 5) + (hash << 2)) + c;
    return hash;
}
```

The hash operation performed by a BGP IO thread 31 for a network prefix of a route included in a routing protocol message determines the route processing thread 26 that is to perform each of Task 1-Task L with respect to the routing protocol message and the route included therein. In the illustrated example for instance, the BGP IO thread 31 performs the assignment task ("assign") that includes the hash operation in order to identify route processing thread 26A as the thread to process route RT1. BGP 10 thread 31 also performs the assignment task to identify route processing thread 26C as the thread to process route RT6. Once a route processing thread has been identified for a route, the BGP IO thread 31 signals the identified route processing thread to perform route processing tasks for the route.

Although BGP IO thread 31 may be a single thread that serially performs the assignment task with respect to routes RT1-RT7, once BGP IO thread 31 has assigned a route and signaled the identified route processing thread 26, the identified route processing thread 26 may assume the route processing tasks Task 1-Task L. Because Task 1-Task L typically require much longer to complete than the assignment task, the techniques may effectively parallelize route processing for routing protocol messages and reduce route processing latency.

Figure 3:
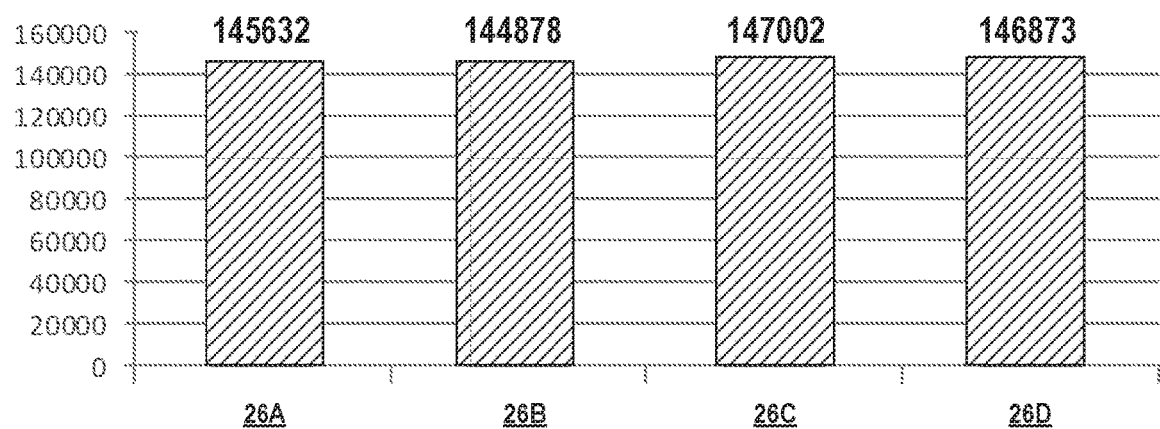
FIG. 3 is a bar graph illustrating example results for distributing routes to a plurality of route processing threads, according to techniques described herein.

FIG. 3 is a bar graph illustrating example results for distributing routes to a plurality of route processing threads according to techniques described herein. Each bar in graph 80 corresponds to a different one of route processing threads 26A-26D of routing processing threads 26 of FIG. 1, where N=4. Graph 80 illustrates fair hashing of the route processing workload, with an even distribution of routes to each of the route processing threads 26A-26D.

Figure 4:
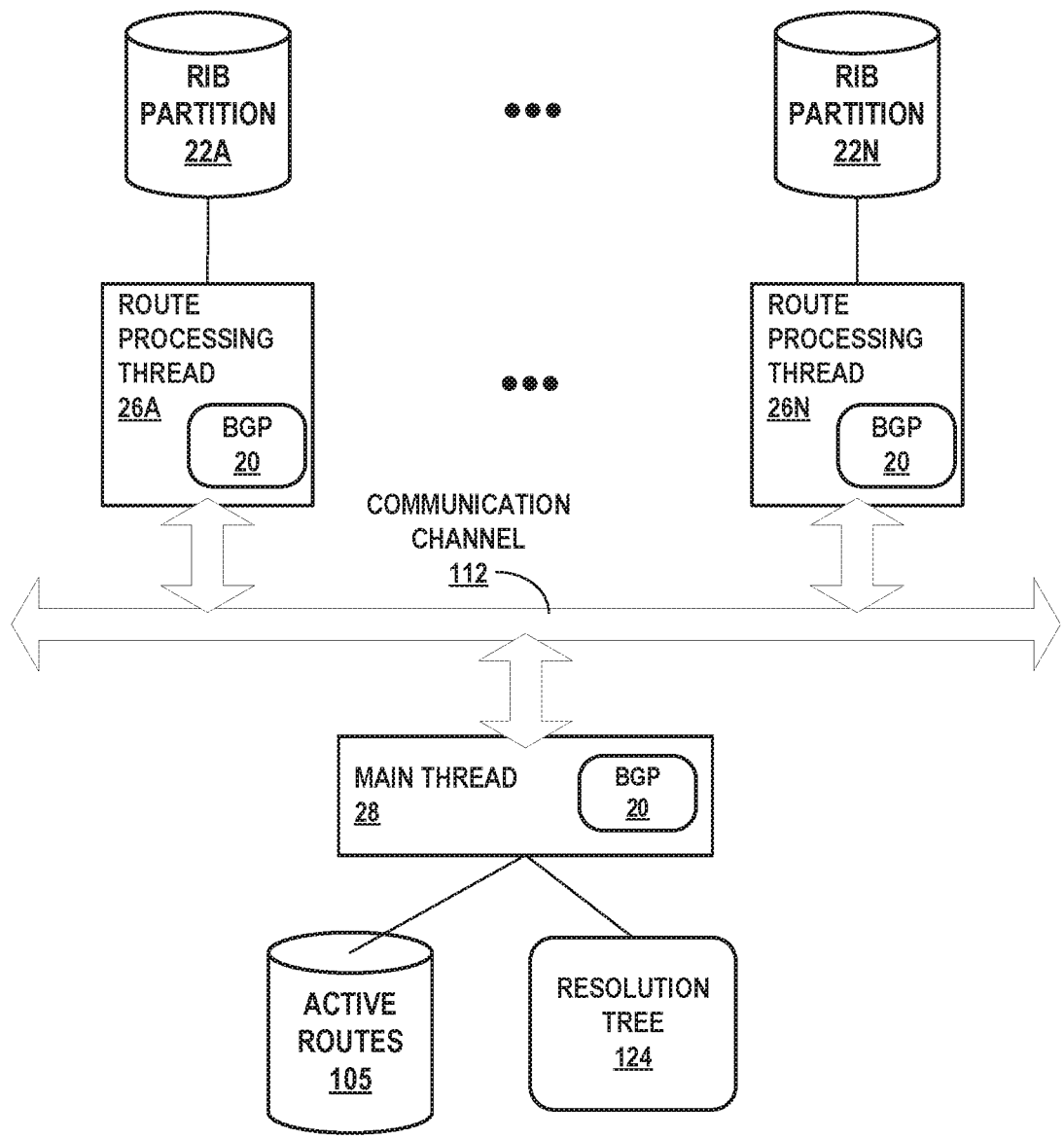
FIG. 4 is a block diagram illustrating example techniques for distributed route processing including route resolution, according to techniques described herein.

FIG. 4 is a block diagram illustrating example techniques for distributed route processing including route resolution, according to techniques described herein. Route processing threads 26A-26N, main thread 28, and BGP IO thread 31 may communicate using an intra-process, inter-thread communication channel 112. Although referred to as a channel, communication channel 112 may represent any type of inter-thread communication, such as a message bus, message queues, message passing, a file, shared memory or buffer, socket, and so forth.

Each of RIB partitions 22 includes one or more routes stored and managed by a corresponding one of route processing threads 26A. Routes stored to RIB partitions 22 may include both active and inactive routes. One or more the routes stored to RIB partitions 22 may be associated with resolution information that describes, for instance, corresponding a forwarding next hop of the network device 12 with which to forward packets that packet the route.

Resolution tree 124 maps network prefixes to forwarding next hops of the network device 12 with which network device 12 is to forward matching packets for the network prefixes. Forwarding next hops may represent next hops for an IGP or LSP route required to reach a next hop received in a routing protocol message, e.g., as a NEXT_HOP attribute of a BGP UPDATE message. Such next hops are in some cases referred to as primary next hops. Resolution may refer to BGP resolution, route resolution for another distance vector protocol, or other route resolution.

Each of route processing threads 26 requests resolution of a next hop for a route, received in a routing protocol message assigned to the route processing thread 26, from main thread 28. Route processing threads 26 request resolution by posting the next hop via communication channel 112 to main thread 28. Route processing threads 26 additionally post respective sets of active routes from RIB partitions 22 to main thread 28, via communication channel 112, which main thread 28 stores to active routes 105. Each posted active route may include a flag indicating whether the route is a supporting route. The main thread 28 maintains resolution tree 124.

If necessary because main thread 28 has not already resolved a next hop, main thread 28 resolves the next hop for which resolution is requested from one of route processing threads 26. Such resolution may generate resolution information for the next hop, e.g., a forwarding next hop for the corresponding route(s) that specify the next hop. Main thread 28 communicates resolution information for the next hop to the requesting one of route processing threads 26, which may store the resolution information to the corresponding RIB partition 22 in association with the routes that specify the next hop. The requesting one of route processing threads 26 may further mark such routes as active. Example algorithms for route resolution are found in U.S. Pat. No. 7,184,437, issued Feb. 27, 2007, which is incorporated by reference herein in its entirety.

Figure 5:
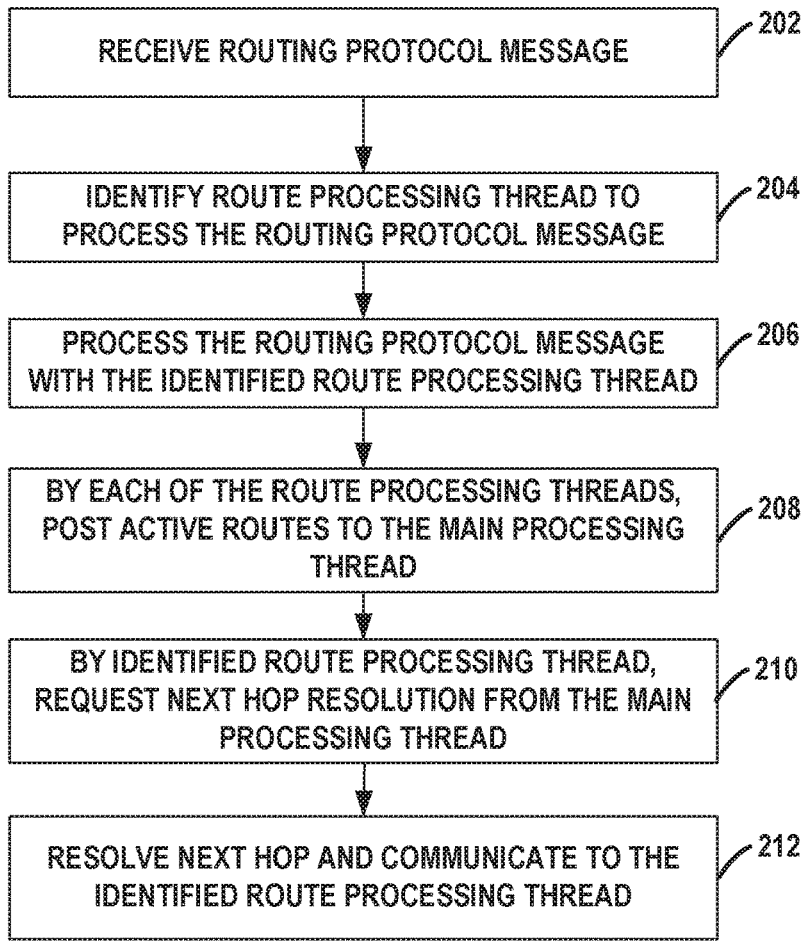
FIG. 5 is a flowchart illustrating an example mode of operation for route resolution, according to techniques of this disclosure.

FIG. 5 is a flowchart illustrating an example mode of operation for route resolution, according to techniques of this disclosure. For purposes of examples, operation 200 is described with respect to FIG. 4. One of BGP IO thread(s) 31 detects that network device 12 has received a routing protocol message (202). The BGP IO thread 31 reads a network prefix from the routing protocol message and applies a hashing or other selection operation to the network prefix to identify one of a plurality of route processing threads 26 with which to process the routing protocol message, and the BGP IO thread 31 notifies the identified route processing thread 26 (204). The identified route processing thread 26 processes the routing protocol message (206).

Each of route processing threads 26 posts active routes to the main processing thread 28 (208). The active routes may represent BGP-advertised prefixes with which a next hop may be resolved to obtain a forwarding next hop. As part of processing the routing protocol message, the identified route processing thread 26 requests, from main thread 28, resolution of a next hop specified for a route included in the routing protocol message (210). Main thread 28 resolves the next hop to obtain a forwarding next hop and returns the forwarding next hop to the identified route processing thread 26 (212), which stored the forwarding next hop and the route in association with one another to the corresponding RIB partition 22.

Route processing threads 26 may post local active routing protocol routes from RIB partitions 22 to the kernel. For example, route processing threads 26 may communicate such routes to a kernel routing table thread for exchanging routes with the kernel routing table, from which operation system 36 may generate FIB 38. At least in some cases, route processing threads 26 may communicate active routes to the kernel routing table concurrently. That is, multiple route processing threads 26 may concurrently download active routes to the kernel routing table.

As noted in this disclosure, route processing threads 26 may concurrently perform tasks for routes. As another example of concurrent task processing, a route processing thread 26A may apply an import or export routing policy to a route associated with a network prefix and assigned to route processing thread 26A, while route processing thread 26B may, concurrently with the policy application by thread 26A, apply a task to another route associated with another network prefix and assigned to route processing thread 26B.

In some examples, processing the routing protocol message with the identified route processing thread 26 for operations 200 may include a path selection task for a new network prefix. Path selection may incorporate routes from protocols other than the routing protocol executed by threads 26, 28, e.g., routes for IGP 42 and/or MPLS (hereinafter, "IGP/MPLS routes"). When BGP 20 routes overlap with IGP/MPLS routes, for instance, network device 12 may be configured with a preference to advertise the IGP/MPLS routes. Route processing threads 26 may therefore access IGP/MPLS routes stored by an IGP/MPLS routing information base (not shown in FIG. 1) to determine whether a more preferred IGP/MPLS route is available in lieu of a route from respective, corresponding RIB partitions 22. In some examples of network device 12, IGP/MPLS routes are distributed and stored among route processing threads 26 in a manner similar to those of the routing protocol 20, as described above.

Figure 6A:
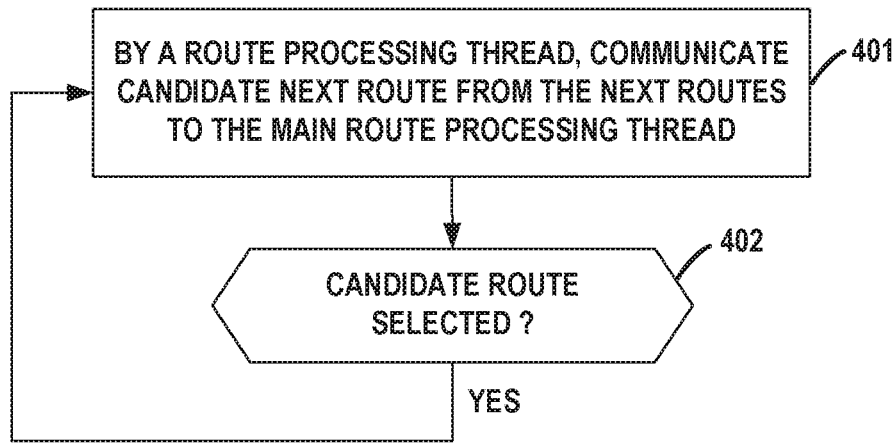
FIGS. 6A-6B are flowcharts illustrating example modes of operation for threads of a route processing module to show routes of a distributed routing information base, according to techniques of this disclosure.
Figure 6B:
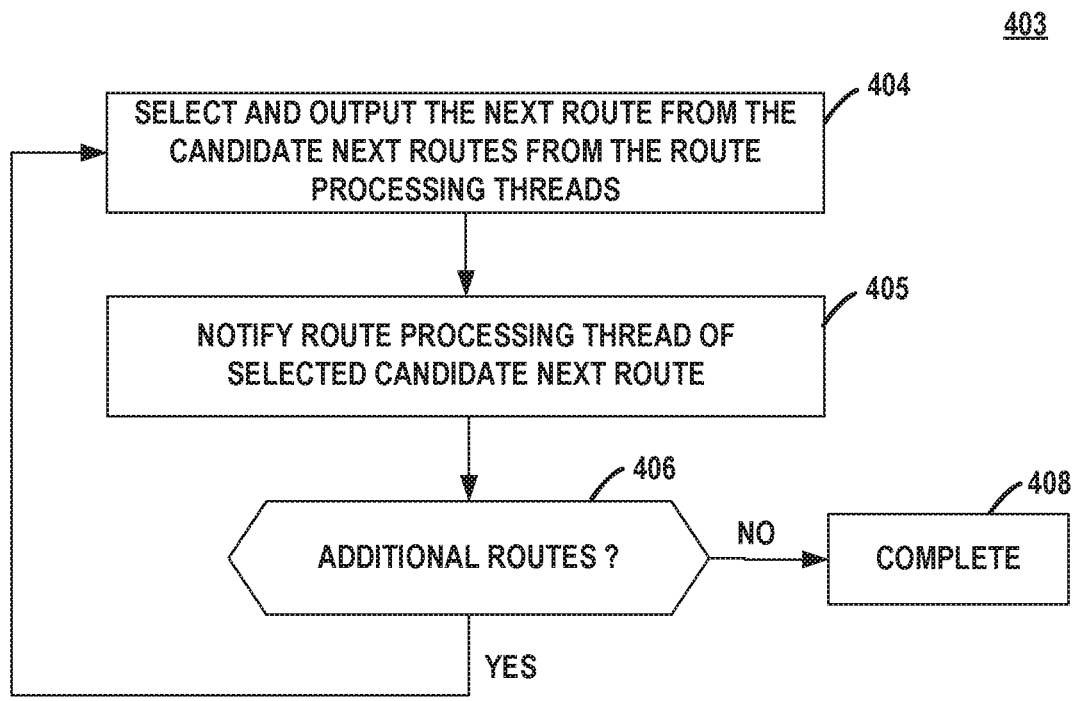

FIGS. 6A-6B are flowcharts illustrating example modes of operation for threads of a route processing module to show routes of the routing information base 22, according to techniques of this disclosure. A show routes operation may be performed in response to a request, via a command-line interface for instance, received by network device 12. The show routes operation typically "walks" the routing information base of a network device to output for display, in order, the active routes stored by a network device 12. Routing protocol module 16 may receive a request to show routes. Main thread 28 may manage reordering the routes received in order from the multiple route processing threads 26, as described below.

Operation 400 is described with respect to route processing thread 26A but may be simultaneously performed by all of route processing threads 26. Route processing thread 26A receives a request from main thread 28 for a next route in RIB partition 22A. Route processing thread 26A determines and communicates the candidate next route in RIB partition 22A to main thread 28 in response to the request (401). Route processing thread 26A may subsequently receive a notification from main thread 28 that the candidate next route was selected (YES branch of 402) and responsively performs 401. Route processing threads 26 concurrently, iteratively perform operation 400 to communicate candidate next routes from respective RIB partitions 22.

Main thread 28 performs operation 403 illustrated in FIG. 6B. Main thread 28 may initiate the distributed show route operation by communicating requests for next routes from RIB partitions 22 to respective route processing threads 26. Main thread 28 receives candidate next routes from respective route processing threads 26. Main thread 28 selects the next route from the candidate next routes and outputs the selected next route for display (404), e.g., via a management interface such as a command-line interface. Main thread 28 also notifies the route processing thread 26 from which the selected next route was selected to cause the route processing thread 26 to perform step 402 of operation 400 (405). If additional candidate next routes are available for selection (YES branch of 406), main thread 28 continues to iteratively select and output such routes for display (404). Otherwise (NO branch of 406), main thread 28 has completed the show routes operation (408).

Routing protocol module 16 may also perform route aggregation to consolidate selected multiple routes from RIB partitions 22 into a single routing protocol advertisement. A route aggregation operation may be performed by threads 26, 28 similarly to operations 400, 403, respectively, to obtain the potential contributing routes for an aggregate route. Main thread 28 may request RIB partitions 22 from route processing threads 26 that match a potential aggregate route. Main thread 28 may apply an aggregate route routing policy to accept or reject each contributing route from route processing threads 26.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:
1. A method comprising:
identifying, with a thread of a plurality of execution threads for at least one routing protocol process executing on a plurality of processing cores of at least one hardware-based processor of a network device, a first route processing thread of the execution threads to process a first route of a routing protocol, the first route received by the network device;
identifying, with the thread, a second route processing thread of the execution threads to process a second route of a routing protocol, the second route received by the network device;
processing, by the first route processing thread executing on a first core of the plurality of processing cores, the first route;
processing, by the second route processing thread executing on a second core of the plurality of processing cores at least partially concurrently with the first route processing thread executing on the first core of the plurality of processing cores, the second route;
storing, by the first route processing thread, the first route to a first routing information base partition that stores routes for the first route processing thread;
storing, by the second route processing thread, the second route to a second routing information base partition that stores routes for the second route processing thread, wherein the first routing information base partition and the second routing information base partition are partitions of an overall routing information base for the network device;
receiving, by a main thread of the execution threads, a request to show active routes stored by the network device;
communicating, by the main thread in response to the request, requests for candidate next routes to the first route processing thread and the second route processing thread;
receiving, by the main thread, from the first route processing thread, a first candidate next route stored to the first routing information base partition;

receiving, by the main thread, from the second route processing thread, a second candidate next route stored to the second routing information base partition;

selecting, by the main thread from among the first candidate next route and the second candidate next route, the first candidate next route as a next route in a route order for the request to show active routes; and outputting, by the main thread for display to a user, in response to selecting the first candidate next route, the first candidate next route.

2. The method of claim 1, wherein identifying a first route processing thread of the execution threads to process the first route comprises:

applying a hash function to the first route to compute a hash value that indicates a hash bucket associated with the first route processing thread, the method further comprising:

signaling the first route processing thread to process the first route.

3. The method of claim 2, wherein applying the hash function comprises applying the hash function to at least a network prefix of the first route.

4. The method of claim 1, wherein the network device comprises one of a router and a route reflector.

5. The method of claim 1, wherein processing the first route comprises performing, by the first route processing thread, a route processing task, and wherein processing the second route comprises performing, by the second route processing thread, the same route processing task at least partially concurrently with the processing of the first route.

6. The method of claim 5, wherein the route processing task comprises one of:

parsing a routing protocol message, generating a route from the routing protocol message, and requesting resolution of a next hop for the route from the routing protocol message.

7. The method of claim 1, wherein processing, by the first route processing thread, the first route comprises parsing a first routing protocol message that includes the first route, generating the first route from the first routing protocol message, and requesting resolution of a first next hop for the first route from the first routing protocol message, and wherein processing, by the second route processing thread, the second route comprises parsing a second routing protocol message that includes the second route, generating the second route from the second routing protocol message, and requesting resolution of a second next hop for the second route from the second routing protocol message.

8. The method of claim 1, further comprising:

communicating, by the main thread after outputting the first candidate next route, another request for a candidate next route to the first route processing thread;

receiving, by the main thread, from the first route processing thread, a third candidate next route stored to the first routing information base partition;

selecting, by the main thread from among the third candidate next route and the second candidate next route, the third candidate next route as another next route in the route order; and outputting, by the main thread for display to the user, in response to selecting the third candidate next route, the third candidate next route.

9. The method of claim 1, further comprising:

communicating, by the first route processing thread to a main thread of the execution threads, a request to resolve a first next hop of the first route;

communicating, by the second route processing thread to the main thread, a request to resolve a second next hop of the second route; and resolving, by the main thread, the first next hop of the first route and the second next hop of the second route.

10. The method of claim 1, further comprising:

downloading, by the first route processing thread to a kernel routing table, the first route;

downloading, by the second route processing thread to the kernel routing table at least partially concurrently with the downloading of the first route, the second route.

11. The method of claim 1, wherein identifying a first route processing thread of the execution threads to process a first route of the routing protocol comprises:

applying a bit pattern to a routing protocol message that includes the first route to obtain a value; and mapping the value to the first route processing thread.

12. The method of claim 1, wherein applying a bit pattern to the routing protocol message that includes the first route to obtain the value comprises applying the bit pattern to bits of a network prefix of the first route.

13. A network device comprising:

a network interface card; and at least one hardware-based processor comprising a plurality of processing cores for executing a plurality of execution threads for at least one routing protocol process, the at least one hardware-based processor configured to:

identify, with a thread of the plurality of execution threads, a first route processing thread of the execution threads to process a first route of a routing protocol, the first route received by the network device;

identify, with the thread, a second route processing thread of the execution threads to process a second route of a routing protocol, the second route received by the network device;

process, by the first route processing thread configured to execute on a first core of the plurality of processing cores, the first route; and process, by the second route processing thread configured to execute on a second core of the plurality of processing cores at least partially concurrently with the first route processing thread executing on the first core of the plurality of processing cores, the second route, store, by the first route processing thread, the first route to a first routing information base partition that stores routes for the first route processing thread;

store, by the second route processing thread, the second route to a second routing information base partition that stores routes for the second route processing thread, wherein the first routing information base partition and the second routing information base partition are partitions of an overall routing information base for the network device;

receive, by a main thread of the execution threads, a request to show active routes stored by the network device;

communicate, by the main thread in response to the request, requests for candidate next routes to the first route processing thread and the second route processing thread;

receive, by the main thread, from the first route processing thread, a first candidate next route stored to the first routing information base partition;

receive, by the main thread, from the second route processing thread, a second candidate next route stored to the second routing information base partition;

select, by the main thread from among the first candidate next route and the second candidate next route, the first candidate next route as a next route in a route order for the request to show active routes; and output, by the main thread for display to a user, in response to the selecting, the first candidate next route.

14. The network device of claim 13, the at least one hardware-based processor further configured to:

identify, by the thread, a first route processing thread of the execution threads to process the first route of the routing protocol by application of a hash function to the route to compute a hash value that indicates a hash bucket associated with the first route processing thread;

signal, by the thread, the first route processing thread to process the first route of the routing protocol.

15. The network device of claim 14, wherein application of the hash function comprises application of the hash function to at least a network prefix of the first route.

16. The network device of claim 13, wherein the network device comprises one of a router and a route reflector.

17. The network device of claim 13, the at least one hardware-based processor further configured to:

process the first route by performance, by the first route processing thread, of a route processing task, and process the second route by performance, by the second route processing thread, of the same route processing task at least partially concurrently with the processing of the first route.

18. The network device of claim 13, the at least one hardware-based processor further configured to:

communicate, by the main thread after outputting the first candidate next route, another request for a candidate next route to the first route processing thread;

receive, by the main thread, from the first route processing thread, a third candidate next route stored to the first routing information base partition;

select, by the main thread from among the third candidate next route and the second candidate next route, the third candidate next route as another next route in the route order; and output, by the main thread for display to the user, in response to selecting the third candidate next route, the third candidate next route.

19. The network device of claim 18, the at least one hardware-based processor further configured to:

communicate, by the first route processing thread to a main thread of the execution threads, a request to resolve a first next hop of the first route;

communicate, by the second route processing thread to the main thread, a request to resolve a second next hop of the second route; and resolve, by the main thread, the first next hop of the first route and the second next hop of the second route.

20. The network device of claim 18, the at least one hardware-based processor further configured to:

download, by the first route processing thread to a kernel routing table, the first route; and download, by the second route processing thread to the kernel routing table at least partially concurrently with the downloading of the first route, the second route.

21. A non-transitory computer-readable medium comprising instructions that, when executed, cause one or more hardware-based processors of one or more network devices to perform operations comprising:

identifying, with a thread of a plurality of execution threads for at least one routing protocol process configured for execution on a plurality of processing cores of the one or more hardware-based processors, a first route processing thread of the execution threads to process a first route of a routing protocol, the first route received by the network device;

identifying, with the thread, a second route processing thread of the execution threads to process a second route of a routing protocol, the second route received by the network device;

processing, by the first route processing thread executing on a first core of the plurality of processing cores, the first route; and processing, by the second route processing thread executing on a second core of the plurality of processing cores at least partially concurrently with the first route processing thread executing on the first core of the plurality of processing cores, the second route;

store, by the first route processing thread, the first route to a first routing information base partition that stores routes for the first route processing thread;

store, by the second route processing thread, the second route to a second routing information base partition that stores routes for the second route processing thread, wherein the first routing information base partition and the second routing information base partition are partitions of an overall routing information base for the network device;

receive, by a main thread of the execution threads, a request to show active routes stored by the network device;

communicate, by the main thread in response to the request, requests for candidate next routes to the first route processing thread and the second route processing thread;

receive, by the main thread, from the first route processing thread, a first candidate next route stored to the first routing information base partition;

receive, by the main thread, from the second route processing thread, a second candidate next route stored to the second routing information base partition;

select, by the main thread from among the first candidate next route and the second candidate next route, the first candidate next route as a next route in a route order for the request to show active routes; and output, by the main thread for display to a user, in response to the selecting, the first candidate next route.

* * * * *